United States Patent Office 3,101,132
Patented Aug. 20, 1963

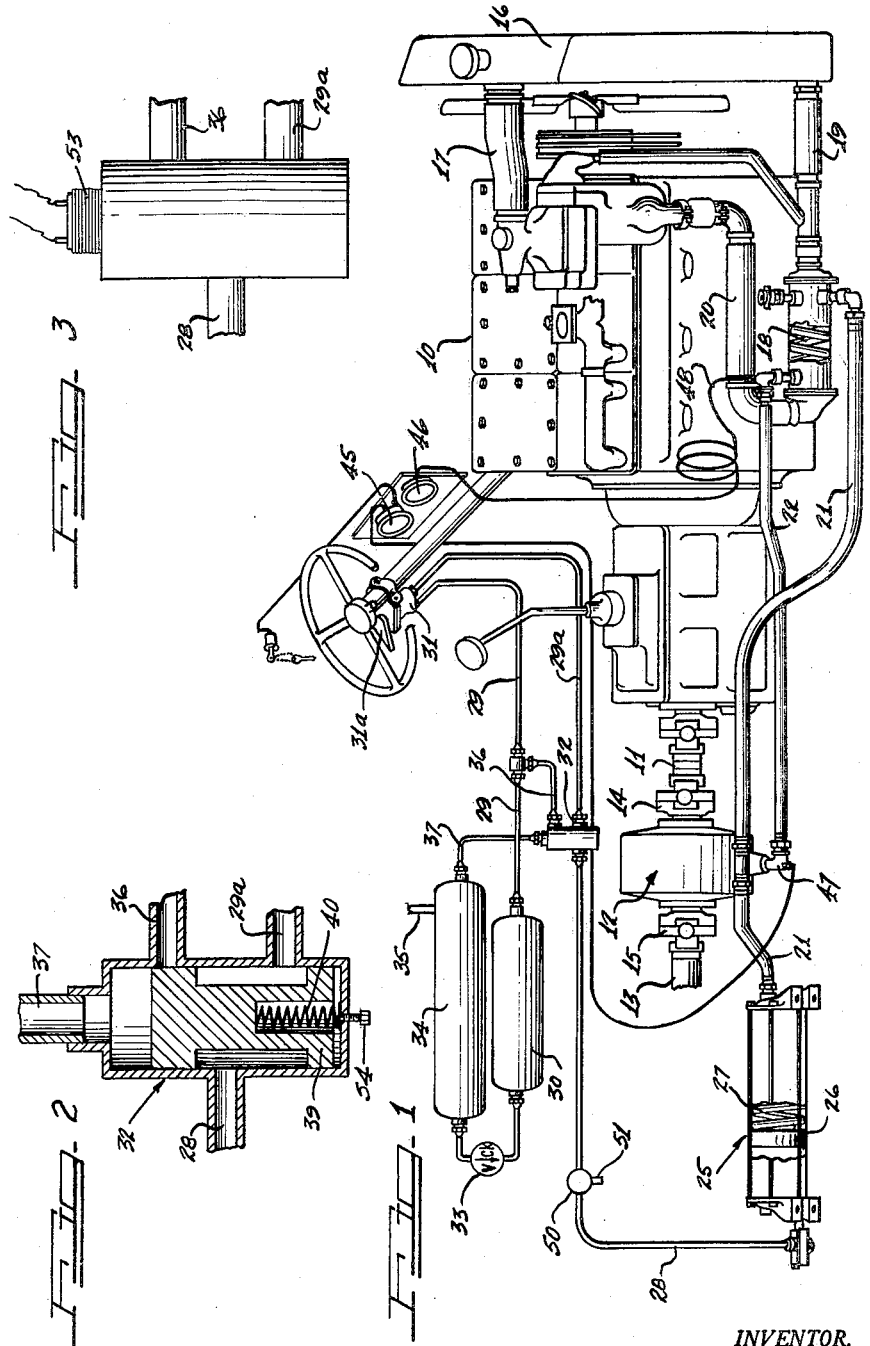

3,101,132
HYDRODYNAMIC RETARDER SAFETY SYSTEM
Edward J. Herbenar, Detroit, Mich., assignor to Thompson Ramo Wooldridge Inc., Cleveland, Ohio, a corporation of Ohio
Filed Sept. 22, 1960, Ser. No. 57,652
8 Claims. (Cl. 188—90)

The present invention relates to a novel means and method for retarding the rotation of a vehicle drive shaft or the like, and, more particularly, concerns the provision of a simple and highly effective means for applying a hydrodynamic drive shaft brake automatically in response to vehicular air pressure failure.

Hydrodynamic brakes for vehicular use are well known. One extremely effective hydrodynamic retarder system for vehicles is to be found in copending application Serial No. 563,032 filed February 2, 1956, now United States Letters Patent No. 2,963,118. In the hydrodynamic braking system of that application, a hydrodynamic retarder is provided for the vehicular drive shaft and is manually controlled to apply a substantial braking force to the drive shaft. This manual control is achieved by loading or unloading hydraulic fluid from the brake by means of pressurized air or similar gas acting against a reservoir of hydraulic fluid. It has been found that this manually controlled system is very effective and the system so constructed has found substantial commercial utility. The present invention is an improvement on the system of said earlier application and comprises a safety or emergency braking system wherein the hydrodynamic brake is automatically filled with hydraulic fluid upon failure of the vehicle air compressor or other source of pressure connected to the hydrodynamic brake for energization thereof.

In accordance with the principles of the present invention, a safety braking system employing a hydraulic hydrodynamic retarder is provided in which emergency braking is accomplished without necessity for an hydraulic circulating pump. Instead, by arrangement of a single automatic control valve in the pressure source for energizing the hydrodynamic brake provides for the automatic application of gas pressure to energize the hydrodynamic brake upon failure of the main gas pressure source.

As those familiar with the heavy trucking industry are aware, substantially all of such trucks provide an air compressor for maintaining a supply of compressed air. This supply of compressed air is employed as the energizing means for the conventional wheel brakes and, in the hydrodynamic braking system of the above-mentioned copending application Serial No. 563,032, is employed for energizing a hydrodynamic brake coupled to the vehicle drive shaft. This conventional source of air under pressure is very satisfactory for purposes of operation of a hydrodynamic brake as well as for operation of the conventional pneumatic brakes. However, while modern manufacturing techniques have provided the trucking industry with pneumatic power brakes of great reliability, nevertheless, brake failures do occur in practice. When such a failure occurs it is quite probable that it takes place when the vehicle is under a heavy load. Very disastrous vehicle accidents have resulted from such brake failures and it is, accordingly, extremely important that every possible safeguard be employed to prevent such accidents.

In accordance with the present invention, a hydrodynamic braking system is employed in which air under pressure or a similar gas is utilized for loading and unloading the hydrodynamic brake. In hydrodynamic braking systems employed in vehicles in the past, a malfunctioning of the air pressure source prevents utilization of the hydrodynamic brake. Since the pressure source for the hydrodynamic brake is ordinarily the same as that providing the source of pressure for conventional pneumatic actuated brakes on the vehicle, the elimination of the pressure source could well render the vehicle substantially without brakes. Such a condition is overcome by the present invention.

By the present invention, a pressure reservoir is provided for the hydrodynamic brake. This reservoir is in addition to the tank ordinarily employed with an air compressor on the vehicle and which conventionally provides a source of pressure for the pneumatic brakes and the hydrodynamic brake. Air under pressure is routed through the added reservoir by way of a one-way check valve so that it may not return to the main storage tank or compressor in the event of failure of either of these latter components. Air is directed from the reservoir to the hydrodynamic brake by way of a manual or other control valve. In addition, however, a bypass valve is provided either as a part of or separate from the regular manual actuating valve, whereby a drop in pressure in the main pressure source will open the bypass to provide direct connection between the hydrodynamic brake and the hydrodynamic brake air reservoir. Upon opening of the bypass the brake is fully energized and is held energized until the air pressure at the main source is again brought to its predetermined operating level or the hydrodynamic brake is intentionally deenergized by manually venting the reservoir. As a result of this arrangement, it will be observed that upon a failure of the braking system pressure source, the hydrodynamic brake will be instantly applied and the vehicle brought to a stop or slowed to a manageable level.

It is, accordingly, an object of the present invention to provide a hydrodynamic braking system for heavy duty vehicles or the like in which the hydrodynamic brake is automatically fully applied upon a failure of the main source of brake application pressure.

Still another object of the invention is to provide an extremely simple and yet effective automatic safety device for vehicles employing a hydrodynamic brake.

Still another object of the present invention is to provide automatic means for retarding a rotating shaft upon the loss of brake control pressure.

A feature of the invention comprises the provision of a separate air reservoir for direct operation of the hydrodynamic brake and separate from the main air pressure storage tank, in combination with an automatically operated valve sensitive to pressure of the main storage tank and/or pressure source.

Still other and further objects and features of the invention will at once appear from a consideration of the attached specification and drawing wherein one embodiment of the invention is shown by way of illustration only, and wherein:

FIGURE 1 is a diagrammatic illustration of the hydrodynamic braking circuit of the present invention as applied to a vehicle;

FIGURE 2 is an enlarged cross-sectional view of the bypass valve employed in the hydrodynamic braking system of the present invention; and FIGURE 3 is a modified form of bypass valve.

As shown on the drawing:

As may be seen from a consideration of FIGURE 1, the system of the present invention is constructed for co-operation with a conventional internal combustion engine 10 which operates to rotate a shaft 11. The shaft 11 is drivingly connected to an output shaft 13 by way of a hydrodynamic brake 12 which is of conventional construction and which may, if desired, comprise a brake constructed in accordance with the above-identified patent application Serial No. 563,032. The specific features of the hydrodynamic brake do not, per se, form any part of the present invention. It will be understood that the universal joints 14 and 15 may be provided between the shafts 11 and 13 and the brake 12 in order to permit positioning of the brake unit conveniently in any portion of the vehicle desired.

It is contemplated that the power plant 10 be liquid cooled and that the liquid coolant be circulated through a heat transfer unit 16 of conventional form. Water leaving the power plant 10 in the heated condition passes through conduit 17 to the heat exchange radiator 16 and from thence flows into a second heat exchanger 18 via conduit 19. From the heat exchanger 18 the coolant flows back into the engine block by way of conduit 20. The heat exchanger 18 may comprise in its simplest form a cylindrical housing as shown in which a helical coil of tubing is positioned. The ends of the tubing connect to conduits 21 and 22 which carry hydrodynamic braking liquid to and from the brake 12 respectively. Accordingly, the heat developed in the brake 12 is circulated to the liquid coolant of the power plant 10.

It will, of course, be understood that although the system of the present invention is llustrated in connection with an automotive vehicle and is designed to have important uses in the vehicles of the heavy duty transport type, nevertheless the hydrodynamic safety braking system of the present invention is equally adatpable to stationary dynamometer installations, industrial power applications, and the like.

In order to retard the vehicle shaft 13, the system of the present invention contemplates the provision of the hydrodynamic brake generally designated 12. The brake has its external housing fixedly secured to the vehicle frame in any conventional manner, not shown. Further, the brake comprises a rotor secured to the rotating shaft and a stator rigidly secured to the brake housing. Upon introduction of liquid into the housing between the rotor and stator braking torque is applied to the shaft 13. The torque may be reduced by withdrawal of liquid from the housing and the torque is completely eliminated upon removal of substantially all of the liquid from the housing.

As in my earlier copending application Serial No. 563,032, above identified, it is preferred that liquid be introduced into the brake 12 from a reservoir 25 comprising a reciprocably mounted piston 26 biased to the left as viewed in FIGURE 1 by a spring 27 and actuatable toward the right to inject liquid from the reservoir into the conduit 22 and the brake circulating system by means of air under upressure introduced via conduit 28. Upon removal of air under pressure from the conduit for any cause, the centrifugal force of the rotor within the hydrodynamic brake 12 will force the liquid outwardly into outlet conduit 22 and thence back into reservoir 25.

Preferably, the liquid capacity of the reservoir 25 is generally that of the hydrodynamic brake 12 so that upon evacuation of the brake the reservoir 25 is substantially filled and upon application of air pressure via conduit 28 of sufficient pressure to force the liquid into the hydrodynamic brake against the centrifugal force applied thereby, the reservoir will be substantially empty of braking liquid. In view of the fact that the pressure applied to the hydrodynamic braking liquid forcing it into the brake 12 comprises air or similar air under pressure, the braking torque of the brake is resiliently controlled. Upon the application of torques in excess of those capable of being handled by the brake, liquid is forced out of the brake into the reservoir 25 against the air pressure. This, accordingly, provides an overload saftey limit which may readily be modified by varying the pressure of the fluid in conduit 28.

The hydrodynamic brake is energized in accordance with the present invention by compressed air or similar gas in reservoir 30, control valve 31 and bypass 32. Air under pressure is introduced into reservoir 30 by way of a one-way check valve 33 past which compressed air flows from a main storage container or tank 34. Tank 34 is ordinarily maintained full of compressed air from a power driven source on the vehicle. That source may be connected to the storage tank 34 by conduit 35.

In ordinary circumstances of operation, the storage tank 34 and the hydrodynamic brake air pressure reservoir 30 are at the same, desired, operating pressure. When the hydrodynamic brake 12 is needed, the vehicle operator operates manual valve 31 by lever 31a thereby directing air under pressure from the storage reservoir 30 to conduit 28 by way of conduit 29, valve 31, conduit 29a, valve 32 and conduit 28. With this application of pressure to conduit 28, the hydrodynamic brake liquid in reservoir 25 is forced into the brake 12 and braking occurs. In this operation, the valve 32 has the parts thereof positioned as shown in FIGURE 2. As there shown, valve 32 comprises a cylindrical housing into which conduits 28, 29a, 36 and 37 are ported. A reciprocal core 39 is biased upwardly by spring 40 into a position normally connecting conduits 28 and 36. However, as may be seen from FIGURE 1, conduit 37 is directly connected to the main pressure storage tank 34 and source 35 so that upon the presence of satisfactory operating pressure at the storage tank 34 the core 39 will be forced downwardly compressing spring 40 and thereby connecting conduits 28 and 29a. Accordingly, when regular operating pressure is available in storage tank 34, the brake may be controlled by the manual valve 31 at will. However, should the pressure in tank 34 drop to a value below which satisfactory operation of the hydrodynamic brake or irregular vehicle brakes are satisfactorily operable, spring 40 will force the core 39 upwardly connecting conduits 29 and 36 thereby directly connecting reservoir 30 with the hydrodynamic brake reservoir 25 independently of whether the valve 31 is open or not. This will, as may be seen, immediately apply the hydrodynamic brake, retarding the vehicle. In view of the utilization of check valve 33, the depletion of pressure in the storage tank 34 will not be similarly followed by a depletion of pressure in reservoir 30.

The temperature and pressure of the hydrodynamic braking liquid are indicated at the vehicle dashboard by respective gauges 45 and 46 of any conventional nature and having sensing units 47 and 48 respectively. As a result of these units the vehicle operator is always aware of the existence of braking pressure in the brake 12 as well as the temperature of the braking liquid. If the hydrodynamic brake 12 is applied, with a resultant indication of pressure at the dashboard gauge, the operator will immediately know that the main pressure source has failed, if the manual lever 31a is in its normal brake inoperative position.

Should it be necessary to release the hydrodynamic brake in order to effect repairs to the system, after its application automatically for a pressure failure, this may be readily accomplished by way of a manual valve 50 connected to vent conduit 28 to an atmospheric vent 51. This valve, although shown diagrammatically, may be placed in any convenient position, for example in the vehicle operator cab.

In the embodiment shown in FIGURES 1 and 2 valve 32 is hydraulically operated. It is within the scope of the present invention to operate the valve 32 by an electrical solenoid in the manner shown in FIGURE 3. There, solenoid 53 is energized upon loss of pressure in the main source, either at tank 34 or source 35. This energization is controlled by a conventional pressure sensitive sensing unit, not shown. The valve core 39 is normally biased downwardly into the position illustrated in FIGURE 2 by a spring. Upon loss of pressure, solenoid 53 is energized by lifting the valve core to connect conduits 28 and 36 in the manner described previously.

It will thus be seen that I have provided a novel hydrodynamic braking system automatically operated to energize the brake upon a failure of the air pressure source of the vehicle. The bypass valve 32 may be made adjustable, by utilization of different strength springs 40, or the provision of an adjusting screw 54 to provide bypassing of the valve 31 at any predetermined minimum pressure in tank 34 or source 35. In the circumstances, complete failure of all of the vehicle brakes is substantially completely eliminated even though the conventional air pressure source is out of order. It will be noted that the system of the present invention provides against starting the vehicle up and into motion when the pressure source is faulty. This is true since under such circumstances, the hydrodynamic brake would be fully applied at the time the vehicle operation was initiated, thereby providing an immediate indication to the vehicle operator that his pressure system was faulty.

It will be obvious to those skilled in the art from a consideration of the specification and drawings above that variations and modifications may be made in the structure illustrated without departing from the scope of the novel concepts of the invention. It is, accordingly, my intention that the scope of the invention be limited solely by that of the hereinafter appended claims.

I claim as my invention:

1. In combination in a safety braking system for vehicles, a shaft, a hydrodynamic brake associated with said shaft for retarding the rotation thereof, a closed brake fluid circulating system including an inlet conduit for conducting fluid into said brake and an outlet conduit providing fluid release from said brake, means connecting said conduits into a closed circulating system, means for rapidly introducing brake fluid into said system at a predetermined adjustable high yielding pressure or withdrawing the fluid while maintaining confinement of the fluid, said means including a closed reservoir connected to one of said conduits and holding a confined displaceable volume of braking fluid sufficient to energize said brake upon movement of said fluid into said one conduit, a source of air under pressure, an air pressure reservoir connected to said source by a check valve permitting flow from said source to said air pressure reservoir only, normally closed manual valve means connecting said air pressure reservoir to said closed brake fluid reservoir to apply the air pressure in said air pressure reservoir to said closed reservoir and manually operable to connect said air pressure reservoir to said closed reservoir to move said displaceable volume of fluid into said one conduit to apply said hydrodynamic brake, and automatic safety means actuated by loss of pressure at said source for directly connecting said air pressure reservoir to said brake fluid reservoir to thereby apply the pressure in said air pressure reservoir to said volume displacing means to force the fluid into the circulating system to energize said brake, said last named means including a bypass valve in the connection between said manual valve means and said closed brake fluid reservoir.

2. In combination, a shaft, a power plant for rotating said shaft, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, a piston movable in a cylinder to force the displaceable volume into said conduit and thence into the brake housing, a source of air under pressure, an air pressure reservoir connected to said source by a check valve permitting flow from said source to said air pressure reservoir only, normally closed valve means connecting said reservoir to said cylinder and manually operable to permit air from said air pressure reservoir to move said piston, and automatic safety means actuated by loss of pressure at said source for bypassing said normally closed valve means manually operable to apply the pressure in said reservoir directly to said cylinder to force the fluid therein into the circulating system to energize said brake said automatic safety means including a bypass valve in the connection between said normally closed valve means and said cylinder.

3. A safety brake system for a rotatable shaft comprising, in combination, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, piston means movable in a cylinder to force the displaceable volume into said conduit and thence into the brake housing, a source of air under pressure, an air pressure reservoir connected to said source by a check valve permitting flow from said source to said air pressure reservoir only, normally closed valve means connecting said air pressure reservoir to said cylinder and manually operable to permit air from said air pressure reservoir to move said volume displacing means, and automatic safety means actuated by a predetermined reduction in pressure at said source for directly connecting said air pressure reservoir to said cylinder to thereby apply the pressure in said cylinder to said volume displacing means to force the fluid into the circulating system to energize said brake said automatic safety means including a bypass valve in the connection between said normally closed valve means and said cylinder.

4. A safety brake system for a rotatable shaft comprising, in combination, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, piston means in a cylinder movable to force the displaceable volume into said conduit and hence into the brake housing, a source of air under pressure, an air pressure reservoir connected to said source by a check valve permitting flow from said source to said air pressure reesrvoir only, normally closed valve means connecting said reservoir to said cylinder and manually operable to permit air from said air pressure reservoir to move said cylinder, and automatic safety means actuated by a substantial loss of pressure at said source for directly connecting said air pressure reservoir to said cylinder to thereby apply the pressure in said reservoir to said piston, said automatic safety means including a bypass valve in the connection between said normally closed valve means and said cylinder to force the fluid into the circulating system to energize said brake.

5. A safety brake system for a rotatable shaft comprising, in combination, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, piston means in a cylinder movable to force the displaceable volume into said conduit and thence into the brake housing, a source of air under pressure, an air pressure reservoir connected to said source by a check valve permitting flow from said source to said air pressure reservoir only, normally closed valve means connecting said reservoir to said cylinder and manually operable to permit air from said air pressure reservoir to move said piston, and automatic safety means actuated by a predetermined reduction in pressure at said source for directly connecting said air pressure reservoir to said cylinder to thereby apply the pressure in said reservoir to said piston to force the fluid into the circulating system to energize said brake, said source comprising an air storage tank, said normally closed valve means including a bypass valve in the connection between said normally closed valve means and said cylinder.

6. In combination, a shaft, a power plant for rotating said shaft, a hydrodynamic brake associated with said shaft for retarding rotation thereof, said brake comprising a rotor secured in said shaft and rotatably mounted in a co-operating closed housing, brake fluid in said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, a piston movable in a cylinder to force the displaceable volume into said conduit and hence into the brake housing, a source of air under pressure, an air pressure reservoir connected to said source by a check valve permitting flow from said source to said air pressure reservoir only, normally closed valve means connecting said reservoir to said cylinder and manually operable to permit air from said air pressure reservoir to move said piston, and automatic safety means actuated by loss of pressure at said source for bypassing said normally closed valve means to apply the pressure in said reservoir directly to said cylinder to force the fluid therein into the circulating system to energize said brake, said normally closed valve means being connected serially between said air pressure reservoir and said automatic safety means.

7. A safety brake system for a rotatable shaft comprising, in combination, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, piston means movable in a cylinder to force the displaceable volume into said conduit and hence into the brake housing, a source of air under pressure, an air pressure reservoir connected to said source by a check valve permitting flow from said source to said air pressure reservoir only, normally closed valve means connecting said reservoir to said cylinder and manually operable to permit air from said air pressure reservoir to move said volume displacing means to force the fluid into the circulating system to energize said brake, said source comprising an air storage tank, and automatic safety means actuated by a substantial loss of pressure at said source to directly connect said air pressure reservoir to said cylinder, said normally closed valve means being connected serially between said air pressure reservoir and said automatic safety means.

8. A safety brake system for a rotatable shaft comprising, in combination, a hydrodynamic brake associated with said shaft for retarding rotation thereof, said brake comprising a rotor secured to said shaft and rotatably mounted in a co-operating closed housing, brake fluid in said housing, a closed brake fluid circulating system including a circulating conduit for conducting fluid into and out of said housing brake fluid reservoir, means connected to said conduit resiliently acting against the fluid to move fluid into the housing at a predetermined adjustable resilient pressure while maintaining confinement of the fluid in the circulating system, said means having a displaceable volume of braking fluid normally under insufficient pressure to move into said housing, means movable to force the displaceable volume into said conduit and hence into the brake housing, a source of air under pressure, an air pressure reservoir connected to said source by a check valve permitting flow from said source to said air pressure reservoir only, normally closed valve means connecting said reservoir to said cylinder and manually operable to permit air from said air pressure reservoir to move said volume displacing means, and automatic safety means actuated by a predetermined reduction in pressure at said source for directly connecting said air pressure reservoir to said brake fluid reservoir to thereby apply the pressure in said reservoir to said volume displacing means to force the fluid into the circulating system to energize said brake, said automatic safety means comprising a two-way valve having a movable core biased into a first position connecting said reservoir to said cylinder by way of the normally closed valve by the pressure of said source and resiliently biased against the pressure in said source toward a second position connecting said reservoir to said cylinder directly, said normally closed valve being connected serially between said air pressure reservoir and said automatic safety means.

References Cited in the file of this patent
UNITED STATES PATENTS

| | | |
|---|---|---|
| 2,240,166 | Stanley | Apr. 29, 1941 |
| 2,289,559 | Turek | July 14, 1942 |
| 2,366,608 | Freeman | Jan. 2, 1945 |
| 2,411,406 | Affleck | Nov. 19, 1946 |
| 2,680,500 | Jenkins | June 8, 1954 |
| 2,781,870 | Clements | Feb. 19, 1957 |
| 2,871,066 | Pannier et al. | Jan. 27, 1959 |
| 2,936,785 | Hastings | May 17, 1960 |
| 2,963,118 | Booth et al. | Dec. 6, 1960 |